June 27, 1933.  J. L. ANDERSON  1,915,914
WELDING METHOD
Filed Jan. 6, 1931   2 Sheets-Sheet 1

June 27, 1933.　　　J. L. ANDERSON　　　1,915,914
WELDING METHOD
Filed Jan. 6, 1931　　　2 Sheets-Sheet 2

INVENTOR
James L. Anderson
BY
ATTORNEY

Patented June 27, 1933

1,915,914

UNITED STATES PATENT OFFICE

JAMES L. ANDERSON, OF TENAFLY, NEW JERSEY, ASSIGNOR TO AIR REDUCTION COMPANY, INCORPORATED, OF NEW YORK, N. Y., A CORPORATION OF NEW YORK

WELDING METHOD

Application filed January 6, 1931. Serial No. 506,874.

This invention relates to a method of welding.

Specifically, the invention is concerned with those processes wherein are welded closed seams formed by abutting or overlapping sheet or plate members, or by juxtapositioning the end edges of pipe or tube members, or by bending or twisting such sheet or plate members into tubular form, either where the side edges of the members are brought into proximity to form a straight line seam, or to form one winding helically, or likewise, around the pipe or tube thus formed. In these operations, the welding of the seams is intended to be carried forward continuously, and with a minimum of supervision; that is, it is desired that the results be attained by means of mechanically controlled apparatus in which the human element takes little if any part throughout the process.

In such welding operations, where oxy-fuel gas or similar apparatus has been utilized for creating the high temperatures necessary for effecting fusion of the seam edges, as the metal is melted at the high temperatures effected, a slag, the composition of which varies, is produced, or separates from the molten metal. At the high temperatures used in welding, the metal naturally is open to oxidation by the action of the surrounding air, while impurities in the metal, such as silicates and the like, melt and erupt through the molten metal. These impurities and the oxide manifest themselves during the welding operation as sparks, flying in all directions and carrying with them portions of the liquid metal.

As is well known, the projection of the jets of flame in the use of oxy-fuel gas apparatus is commonly effected by a tip the body of which has a face from which open a plurality of jet orifices. The sparks of impurities and molten metal fly indiscriminately upwardly from the fusing, and the fused, metal. Such flying impurities are known actually to impinge upon and strike into an orifice. Complete stoppage of the orifice might result; however, if the slag be of sufficient fluidity at the moment of impact and the pressure of the gas at the orifice be sufficiently high, such particles would be blown away from the orifice, possibly to remain adhering to the tip face around the orifice. In other instances, the flying particles may strike and immediately attach themselves to the body of the tip along the face between orifice openings. These portions of adhering impurities thereafter provide a base to which further particles may more easily adhere, building up on the face around the orifices an irregular surface, so as to form substantially a continuation of the tip face. Jets, which previously issued from the tip face, now would open from the aforesaid irregular surface, which would be closer to the molten metal than the tip face itself. Irregularity in the operation of the welding action would occur, since the position of the flame jets with relation to the metal being heated requires practically critical adjustment.

In the use of oxy-fuel gas burners of the type hereinabove set forth, the fuel gas, especially where acetylene is used, breaks down in its initial reaction with oxygen to hydrogen and carbon monoxide. This step in the combustion of the fuel gas is the one in which the highest temperature is attained. For the purpose of this portion of the reaction, it is necessary to mix, beforehand, with the fuel gas a quantity of pure oxygen closely approaching that mathematically required. Excess gas, to rob the high temperature gases of their heat, and thus to reduce the effective temperature of the flame jets, is to be avoided as far as possible.

However, the products of this oxidation stage, the hydrogen and the carbon monoxide, must be reckoned with. These gases are themselves incapable of supporting combustion, requiring oxygen in some form for that purpose. Immediately on their formation, these gases are at, and immediately around, the primary flame jets themselves, forming what has been called the "hydrogen envelope gases". It has been found necessary that combustion of these envelope gases be continuous in order that the cones or high temperature jets may function; otherwise, inadequate combustion of the envelope gases may result in interrupting combustion of the main jets individually, or in their entirety. If there is not sufficient access of atmospheric oxygen to the envelope gases adjacent the jets, and especially if the jets are positioned closely adjacent each other, and the hydrogen envelopes thereof substantially intersect, this difficulty may be pronounced. In such arrangements, the intersecting envelopes act upon each other and on the burning jets, partly excluding the atmospheric oxygen supply, and such conditions have been known to cause complete extinguishment of one or more of such jets.

The temperature of the burning envelope gases is relatively low as compared with the temperature of the cones or primary flame jets, which constitute the active fusing and welding agency. Nevertheless these envelope gases are capable of producing a large amount of heat. In ordinary welding operations this heat is not only largely wasted but causes serious trouble and inconvenience, since the gases spread freely and rise in large volumes and to a considerable height around the torch, are trying to the attendant and interfere with his observation of and attention to the welding operation.

The invention has particular reference to methods of progressively and continuously welding seams by the projection of a plurality of jets at the seam edges, the jets being arranged in a line or lines, substantially conforming to the path of the seam when moved relatively to the jets. While the invention herein is capable of application to methods of welding wherein the jets are arranged in a single line, it has a singular application in the method of welding seams in accordance with my Patent 1,402,997, dated January 10, 1922, using burner tips of the type set forth in my Patent 1,516,486, dated Nov. 25, 1924. In such a plan the jet orifices are arranged in a set of parallel or non-parallel lines, so that rows of adjacent jets are formed. Atmospheric oxygen may reach the outer faces of the jets, but is restricted in its access to the faces of the jets between the rows and lines of jets. In order to maintain these jets burning, it has been found necessary under some conditions to mix with the fuel gas a quantity of oxygen greater than that necessary to assure the intermediate combustion to hydrogen and carbon-monoxide. One such condition presents itself when the clamps for holding the sheet edges in position so closely approach the burner tip as to provide an additional bar against access of atmospheric oxygen to the gas jets. A large excess of oxygen in the original mixture may reduce the effective temperature of the flame jets, and produce a great increase in the quantity of sparks flying away from the weld. The oxygen issues from the orifices together with the fuel gas, and is discharged against the molten metal, churning it and coming into intimate contact therewith, so that oxidation of the metal results. The sparks of oxide thus produced fly away from the fused metal, together with such other exploding impurities as may erupt from the melt.

In my application Serial No. 472,511, filed August 2, 1930, I have provided a burner tip construction designed to reduce, to as great a degree as possible, the surface of the tip from which the jet orifices open and to which slag or oxide might adhere. This burner tip, while not a necessary part of the present invention, is intended, in a specific construction, to be utilized for more effectively carrying out the object hereof. In a tip such as shown in said application the burner face is notched out both to decrease the area of the face from which the jet orifices open and to provide conducting passages for bringing atmospheric gases to the envelope gases in proximity to the point of their formation.

It is an object of this invention to provide a method of welding, in which the amount, and therefore the delivery pressure, of oxygen necessary for effecting the welding operation may be cut down to such extent that the quantity of oxide sparks arising from the weld will be much reduced or entirely eliminated, without danger of interrupting continued combustion of the flame jets by reason of insufficient oxygen.

It is an additional object of this invention to provide in such method means for burning the envelope gases in close proximity to the margins of the seam to be welded, or to the surface of the work, in order that the heat energy of the envelope gases may be utilized to promote the welding operation. This also minimizes or eliminates the trouble and annoyance for which these gases have heretofore been responsible in continuous, multiple jet seam welding operations.

In order to effect these results, a blast or blasts of a combustion-supporting gas are directed to act upon the envelope gases in the vicinity of the parts being welded. These blasts act to burn the envelope gases closer to the body of the tip and to the seam margins against which the flame jets are directed, or closer to the surface of the work. The effect of such blasts, which preferably are blasts of air, may be to impel the envelope gases back toward the burner tip, the moving gas deflecting the sparks erupting from the weld away from the tip. In this manner the possibility that slag sparks will reach the burner tip is minimized. Since an external or additional oxidizing agent has been provided for burning the envelope gases, so that it is no longer necessary to mix with the fuel gas before its combustion an excess of oxygen, the quantity of oxygen supplied, and therefore the pressure at which it is fed to the jets, may be decreased to that required only for burning the fuel gas to hydrogen and carbon monoxide. Since substantially no active oxygen is discharged at the molten metal, substantially no oxidation of such metal will occur, and a reduction in the churning action of the jets will be effected, in consequence of which a weld of substantially no porosity, because of absence of occluded gas, will be produced.

It is intended that the burner tip set forth in my prior application hereinabove mentioned should be positioned so that the notched surface thereof will cooperate with the gas blasts to guide such gas portions which may be driven back against the burner tip down toward the weld, there to give up heat to the metal and facilitate the welding operation.

Preferably the gas blasts will be disposed on either side of the burner tip, and will be directed toward the tip so that a substantially horizontally moving flow of gas will result. It is possible to dispose the gas blasts at either side of the burner tip, and to direct such blasts downwardly along the side walls of the tip, in which event some of the elements of this invention will be realized. In such case, the hydrogen envelope gases will be spread out over a wider area of metal than were the blasts directed from the sides of the tip. In the latter case, the area over which the hydrogen envelope gas burns is less than in the former case, and the hydrogen and carbon monoxide gases, which are effective reducing agents, are forced back toward the burner tip, covering the melted and melting metal and preventing oxidation thereof while at the high temperature of welding.

In order to take further advantage of this protecting property of the hydrogen, or reducing, envelope gases, the blasts may be directed to impel these gases not only toward the burner tip, but also in the direction of that portion of the seam which is in the molten stage or is passing to the congealed condition. If preferred, the blasts may be directed to drive the burning envelope gases rearwardly toward that portion of the seam which is as yet unclosed, so that the metal of the seam edges may be preheated thereby; blasts may also be disposed to move the envelope gases in both directions simultaneously, the effect upon slag sparks remaining the same throughout any of these various operations.

Other objects of this invention will be apparent from the drawings and from the description thereof, or will be specifically indicated herein.

The invention is not intended to be restricted to the construction and arrangement of parts herein shown and described, nor to the precise methods of operation herein set forth, nor to the various details thereof as the same may be modified in various particulars without departing from the spirit and scope of the invention, practical embodiments of which have been herein illustrated and described without attempting to show all the various forms and modifications in which the invention might be embodied.

On the drawings, where are disclosed preferred embodiments of the invention:

Figure 1:
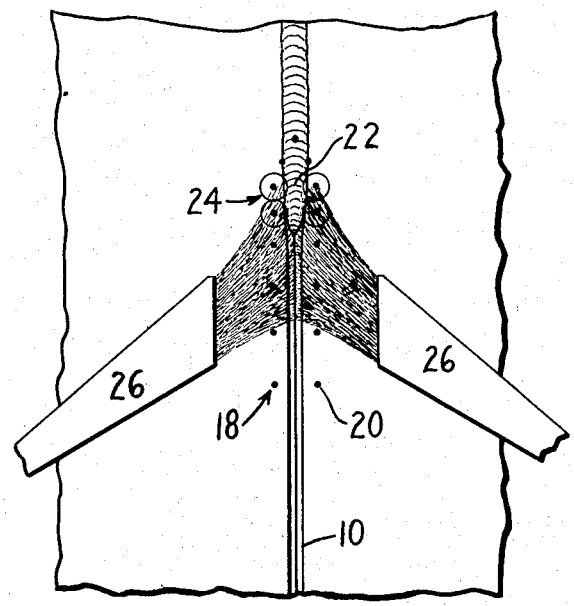
Fig. 1 is a schematic plan view illustrating the relation of the flame jets and the air blasts, directed toward the seam during a welding operation, in a manner embodying the invention.
Figure 2:
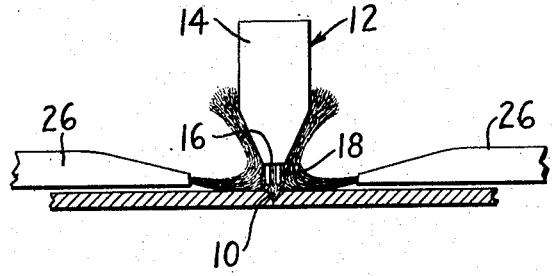
Fig. 2 is a view in end elevation, looking along the seam at a burner tip, with which have been related air blasts in the manner of Fig. 1.

The invention, the broad aspect of which appears from Figs. 1 and 2, is shown applied to the welding of a seam 10 formed between two metallic members. The seam may be that formed by disposing in abutting or overlapping relationship a pair of plane members or the end edges of pipe or tube members, or it may be the longitudinal seam formed by bending sheet or plate metal so that the longitudinal edges of the sheet or plate are brought into abutting relation, or it may be the helical seam formed by twisting such sheet or plate metal.

In any one of these cases, the welding operation involves effecting relative motion of the seam and a device 12 for creating a high temperature in the immediate neighborhood of the seam, so that continuous heating, melting, and subsequent cooling of the abutted edges will be effected, and consequent fusion and welding together of the seam edges will result. In a preferred method, the high temperature device is retained stationary, while the seam is moved with relation thereto.

The particular application of the invention illustrated herein involves the use of an oxyacetylene torch 12 as the high temperature device, and preferably a torch having a tip 14 from the face 16 of which open a plurality of jet orifices for directing a number of oxy-fuel gas jets 18 at the metal of the margins of seam 10. It will be understood that the torch is of the type in which the oxygen and acetylene for the high temperature flame jets are pre-mixed. While the invention may be applied in connection with an arrangement of the jets in a single line, a preferred arrangement is that shown by the indications 20 in Fig. 1, wherein the orifices are shown arranged in lines longitudinally of the burner face and rows transversely of such face, or in an equivalent arrangement, in the manner and for the purposes of my aforesaid patents. As many of these jets are provided as are necessary to bring the metal, moving therebeneath, to fusion within the time period during which any specific portion of metal is subjected to the action of such jets. At the region 22, where interfusion of the seam edges occurs, it is preferred that the lines of jets converge toward each other, since at this point the seam edges are brought closer into proximity and finally are urged into abutment. A pool of molten metal forms in this region, both from metal melted from the seam edges and by the addition of metal melted from a rod or wire in the customary manner.

In addition to the convergence of the flame jets, there must be considered the greater concentration of jets in the immediate neighborhood of the welding region. As indicated at 24, where the jets are closely adjacent to each other the hydrogen envelopes of these adjacent jets will meet and unite, leaving no passage for the entry of atmospheric oxygen to the envelope gases which are part of the common envelope. Combustion at some of such jets, and especially in the neighborhood of the weld point where the orifices may be converged and concentrated, has been known to be stopped completely by such lack of oxygen. At the welding neighborhood, or elsewhere, cessation of heating at any time may result in a serious defect in the weld, due to incomplete interfusion of the seam edges.

I have found that by positioning a pair of nozzles 26 on either side of the burner tip 14 from which issue the flame jets 18, and by means of the nozzles directing blasts of an oxygen-bearing gas such as air toward the jets, many of these defects in operation are eliminated. The particular design of the nozzles is not of considerable moment in the application of this invention; it is, however, preferred that a formation such as that shown in the drawings be utilized in order that the oxidizing gases be directed over a greater compass in effecting combustion of the envelope gases. It is easily understandable that these blasts of gas will act to burn the hydrogen envelope gases more quickly. The rapid combustion of the envelope gases causes a movement of such gases toward the oxidizing gases, that is, the blast gases, and away from the burner tip and the gas jets at which the envelope gases originate. Thus, to a large extent, the accumulation of such envelope gases around the jets is obviated, while combustion of the envelope gases closer to the seam margins is effected, so that heating of the metal in close proximity to the seam edges is more effectively produced. However, it is not necessary to concentrate the burning of the envelope gases adjacent the seam, since if they are burned close to the surface of the work, and even though this burning extend over the surface, conduction losses in the metal will be greatly reduced and the high temperature jets, namely the cones of the flames, will receive much assistance in fusing the metal. By supplying a combustion-supporter to the envelope gases, this combustion-supporter being distinct from the oxygen which is pre-mixed with the acetylene, so that much of the heat of the burning envelope gases is put into the metal to be welded instead of being lost, an important enonomy in the consumption of the welding gases supplied to the torch and a very substantial gain in the linear speed of welding seams are realized. Furthermore, the usual voluminous envelope flame, which has made so much trouble in multiple-jet seam-welding, is largely suppressed by being caused to burn where it will perform useful work. If air is used as the additional supporter of combustion, the advantages of the invention are secured at the least expense.

Figure 3:
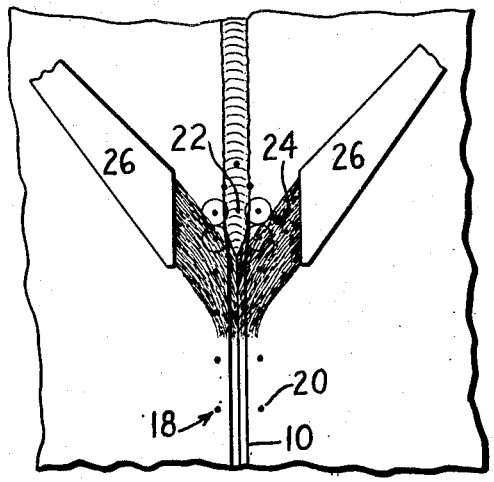
Fig. 3 is a view similar to Fig. 1, but in which the air blasts are directed to propel gases therefrom along the seam oppositely to that effected by the blasts in Fig. 1.

In Figures 1, 2 and 3, the nozzles have been positioned so that the blasts issuing therefrom will move substantially horizontally, as opposed to the substantially vertical disposition of the flame jets. With this relation, the tendency of the air blasts is to lift the hydrogen envelope gases against which they impinge. The envelope gases, which ordinarily would have been spread out over the sheet surface of the member against which flame jets are directed, are now pushed back toward the flame jets, while their combustion is being completed. A sufficient impetus is given to the hydrogen envelope gases by this impelling action of the air blasts, so that they move in a marked current toward and beneath the burner tip. Sparks arising from the weld are deflected by the impelled gas from their movement upwardly toward the burner tip, thus reducing the possibility of slag or oxide particles adhering to the tip face and impairing the operation of the burner.

I have found that the pressure of air for the air blasts most desirable is about one-half ounce, but this may be varied. By spacing the nozzles from three to eight inches away from the flame jets so that the blasts are directly transverse to such jets I have found that the result is very effective.

In a preferred method of welding by the process herein set forth and embodying the invention, I have found it desirable to point the blasts so that they will effect movement of the hydrogen envelope gases in the same general direction as that in which the seam is moving relatively to the burner tip. In no case is the air blast pressure made of sufficient proportions that the oxidizing gases of the blasts will break through the hydrogen envelope and act upon the molten metal to form undesirable oxides. However, by properly controlled action of the blasts, the hydrogen envelope gases may be caused to move toward and over metal being fused, over such metal while continuing in a state of fusion, and over such metal which having been fused and congelation having set in is cooling to non-oxidizing temperatures, and thus to prevent access of oxidizing gases to the hot, reactive metal during these periods. Some or all of the blasts may also be turned to effect movement of the hydrogen envelope gases toward that portion of the seam which is still unwelded, in order to preheat the same before effective welding temperatures are created. Such preheating may occur to the exclusion of the protective operation above set forth, or by utilizing a plurality of independent nozzles may be effected simultaneously therewith.

For the purpose of securing these results, the nozzles are angularly disposed, as indicated in Fig. 1, so that the blasts will be brought to bear not only transversely of the flame jets but also in such direction that the hydrogen envelope gases struck thereby will move along the burner tip in the desired direction. As shown in Fig. 1, such movement would be toward the welding region and the cooling welded seam. In Fig. 3, the nozzles have been turned to force movement of the gases toward the open seam, where the metal is still substantially cold. It is, of course, obvious that the two sets of nozzles could be combined for simultaneous operation.

Figure 4:
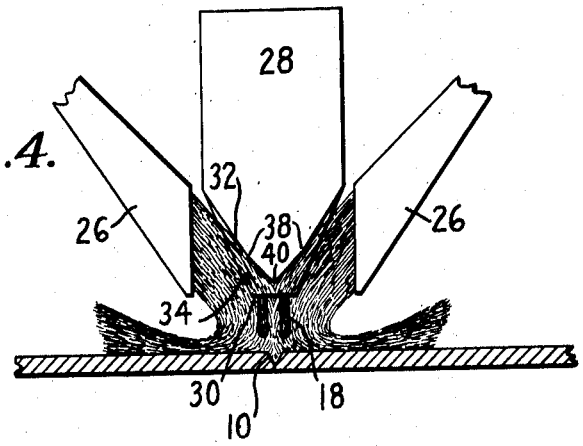
Fig. 4 is a view similar to Fig. 1 but in which the air blasts are directed vertically downwardly, as opposed to the substantially horizontal position of the blasts in Fig. 1, and in which a burner tip with notched faces cooperates with the air blasts.
Figure 5:
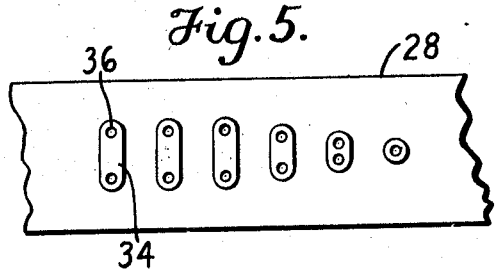
Fig. 5 is a bottom plan of a burner of the type utilized for the combination of Fig. 4.

In Fig. 4 there is shown a modification of the invention, in which the air blasts have been directed downward, that is, substantially parallel to and not transversely of the flame jets. This method of operation will also effect such combustion of the hydrogen envelope gases that there will be substantially no tendency to interrupt continued combustion at the flame jets. Consequently, the necessity for additional oxygen, mixed with the fuel gas, to effect such continued combustion is avoided. Sparks flying up at the tip are reduced or substantially eliminated.

In this modified application of the invention there is shown a burner tip 28, constructed in the manner set forth in my copending application Serial No. 472,511, filed August 3, 1930. This tip has the orifice face 30 thereof cut out to provide a plurality of notches 32. The body metal 34, left along the face by the notching is merely sufficient for drillings 36 for orifices to be provided in face 30. The notches are formed by making two converging cuts to provide converging faces 38 in the opposite vertical faces of the tip. A sharp line edge 40 is formed at the junction of the converging faces, a short distance above the plane of the face 30. As set forth in my aforesaid copending application, slag particles directed upwardly at face 30 either will be deflected by the faces 38 or will find but little surface in face 30 to which to adhere, due to the cut-away portions around the orifices. The formation of the notches provides means for cooperation with the gases moving under the action of the gas blasts. The faces 38 form guides for such gases, assisting in guiding them, together with any atmospheric gases which may move in from above the burner tip, downwardly toward the flame jets.

As many changes may be made in the process herein involved, and many widely different embodiments of the invention designed, without departing from the scope of the invention as defined in the accompanying claims, the matter set forth by the above description may be interpreted as illustrative of operative, but not limiting, embodiments of the invention.

I claim:

1. A method of progressively welding a seam between metal parts, which comprises applying a seamwise-extended set of high-temperature flame jets to heat and fuse the portions to be united, while producing continuous relative movement between the jets and the seam, supplying said flame jets with a mixture of oxygen and fuel gas in which the quantity of oxygen is much less than sufficient for complete combustion of the fuel gas, and furnishing another supply of combustion-supporting gas to the combustible envelope gases emanating from the numerous high-temperature jets.

2. A method of progressively welding a seam between metal parts as set forth in claim 1, wherein the high-temperature flame jets are delivered in a plurality of transversely spaced lines or rows and wherein the additional combustion-supporter is supplied so as to insure adequate access of oxygen to the envelope gases surrounding the closely disposed jets.

3. A method of progressively welding a seam between metal parts, which comprises applying a seamwise-extended set of high-temperature flame jets to heat and fuse the portions to be united, while producing continuous relative movement between the jets and the seam, supplying said flame jets with a mixture of oxygen and fuel gas in which the quantity of oxygen is much less than sufficient for complete combustion of the fuel gas, and directing currents of air to burn the combustible envelope gases emanating from the numerous high-temperature jets.

4. A method of progressively welding a seam between metal parts, which comprises applying a seamwise-extended set of high-temperature flame jets to heat and fuse the portions to be united, while producing continuous relative movement between the jets and the seam, supplying said flame jets with a mixture of oxygen and fuel gas in which the quantity of oxygen is much less than sufficient for complete combustion of the fuel gas, and delivering additional streams of compressed combustion-supporting gas into contact with the envelope gases in the vicinity of the welding operation.

5. A method of progressively welding a seam between metal parts, which comprises applying a seamwise-extended set of high-temperature flame jets to heat and fuse the portions to be united, while producing continuous relative movement between the jets and the seam, supplying said flame jets with a pre-formed oxyacetylene mixture yielding carbon monoxide and hydrogen as envelope gases going out from the high-temperature jets, and delivering additional streams of combustion-supporting gas to maintain combustion of these envelope gases in the vicinity of the closely spaced jets.

6. A method of progressively welding a seam between metal parts, which comprises applying a seamwise-extended set of high-temperature flame jets to heat and fuse the portions to be united, while producing continuous relative movement between the jets and the seam, supplying said flame jets with a pre-formed oxyacetylene mixture yielding carbon monoxide and hydrogen as envelope gases going out from the high-temperature jets, and separately introducing combustion-supporting gas to burn these envelope gases close to the parts that are being welded.

7. A method of progressively welding a seam between metal parts, which comprises applying a seamwise-extended set of high-temperature flame jets to heat and fuse the portions to be united, while producing continuous relative movement between the jets and the seam, supplying said flame jets with a pre-formed oxyacetylene mixture yielding carbon monoxide and hydrogen as envelope gases going out from the high-temperature jets, and delivering air blasts in the vicinity of the flame jets to maintain the combustion of these envelope gases as they issue from the flame jets.

8. A method of progressively welding a seam between metal parts, which comprises applying a seamwise-extended set of high-temperature flame jets to heat and fuse the portions to be united, while producing continuous relative movement between the jets and the seam, supplying said flame jets with a mixture of oxygen and fuel gas in which the quantity of oxygen is much less than sufficient for complete combustion of the fuel gas, and directing air blasts across the path of the flame jets.

9. A method of progressively welding a seam between metal parts, which comprises applying a seamwise-extended set of high-temperature flame jets to heat and fuse the portions to be united, while producing continuous relative movement between the jets and the seam, supplying said flame jets with a mixture of oxygen and fuel gas in which the quantity of oxygen is much less than sufficient for complete combustion of the fuel gas, supplying streams of combustion-supporting gas to contact with the issuing envelope gases, and directing these burning gases over the surface of the parts being welded.

10. A method of progressively welding a seam between metal parts, which comprises applying a seamwise-extended set of high-temperature flame jets to heat and fuse the portions to be united, while producing continuous relative movement between the jets and the seam, supplying said flame jets with a mixture of oxygen and fuel gas in which the quantity of oxygen is much less than sufficient for complete combustion of the fuel gas, supplying other streams of combustion-supporting gas to contact with the issuing envelope gases, and directing these burning gases over the surface of the parts being welded in the general direction of movement of the seam relative to the jets.

11. A method of progressively welding a seam between metal parts, which comprises applying a seamwise-extended set of high-temperature flame jets to heat and fuse the portions to be united, while producing continuous relative movement between the jets and the seam, supplying said flame jets with a mixture of oxygen and fuel gas in which the quantity of oxygen is much less than sufficient for complete combustion of the fuel gas, supplying other streams of combustion-supporting gas to contact with the issuing envelope gases, and directing these burning gases over the surface of the parts being welded in a general direction contrary to the direction of movement of the seam relative to the jets, so that the heat liberated by these gases is effectively utilized for preheating of the metal to be welded.

12. A method of progressively welding a seam between metal parts, which comprises applying a seamwise-extended set of high-temperature flame jets to heat and fuse the portions to be united, while producing continuous relative movement between the jets and the seam, supplying said flame jets with a mixture of oxygen and fuel gas in which the quantity of oxygen is much less than sufficient for complete combustion of the fuel gas, supplying additional streams of combustion supporting gas, and directing these streams downward at the sides of the seamwise-extended set of high-temperature jets to mingle with the envelope gases and promote their combustion close to the jets and to the surface of the parts being welded.

13. A method of progressively welding a seam between metal parts, which comprises applying a seamwise-extended set of high-temperature flame jets to heat and fuse the portions to be united, while producing continuous relative movement between the jets and the seam, supplying said flame jets with a mixture of oxygen and fuel gas in which the quantity of oxygen is much less than sufficient for complete combustion of the fuel gas, and directing air currents toward the flame jets so as to burn the envelope gases emanating therefrom and to minimize the building up of slag and oxide on the surface from which the flame jets are delivered.

JAMES L. ANDERSON.